United States Patent
Shows et al.

(10) Patent No.: US 11,829,216 B2
(45) Date of Patent: Nov. 28, 2023

(54) SYSTEM AND METHOD OF ENHANCING PERFORMANCES OF INFORMATION HANDLING SYSTEMS BY UTILIZING GRAPHICS PROCESSING UNITS

(71) Applicant: Dell Products L.P., Round Rock, TX (US)

(72) Inventors: Thomas Alexander Shows, Leander, TX (US); Yi-Ting Wang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 396 days.

(21) Appl. No.: 17/208,677

(22) Filed: Mar. 22, 2021

(65) Prior Publication Data

US 2022/0300050 A1    Sep. 22, 2022

(51) Int. Cl.
G06F 1/20 (2006.01)
G06F 13/42 (2006.01)
G06T 1/20 (2006.01)

(52) U.S. Cl.
CPC .......... *G06F 1/206* (2013.01); *G06F 13/4221* (2013.01); *G06T 1/20* (2013.01); *G06F 2213/0026* (2013.01)

(58) Field of Classification Search
CPC ............... G06F 1/206; G06F 13/4221; G06F 2213/0026; G06F 1/329; G06F 2209/509; G06F 9/4893; G06F 9/5044; G06F 9/5094; G06T 1/20
USPC ........................................................ 700/300
See application file for complete search history.

(56) References Cited

U.S. PATENT DOCUMENTS

| | | | | |
|---|---|---|---|---|
| 7,653,824 B2 * | 1/2010 | Rangarajan | ............. | G06F 1/206 713/340 |
| 8,233,000 B1 * | 7/2012 | Diard | ..................... | G09G 5/363 345/503 |
| 8,259,119 B1 * | 9/2012 | Diard | ................... | G06F 1/3293 345/503 |
| 8,839,012 B2 * | 9/2014 | Khodorkovsky | ..... | G06F 1/3296 713/320 |

(Continued)

OTHER PUBLICATIONS

Dual-Core Intel Xeon Processor 5100 Series—Datasheet, Aug. 2007; 112 pages, Aug. 2007.

*Primary Examiner* — Chun Cao
(74) *Attorney, Agent, or Firm* — McDermott Will & Emery LLP (57) ABSTRACT

In one or more embodiments, one or more systems, one or more methods, and/or one or more processes may determine a temperature value associated with a discrete graphics processing unit (dGPU); if the temperature value is below a threshold temperature value: configure an information handling system (IHS) to utilize the dGPU for processing graphics workloads of the IHS; disable an integrated graphics processing unit (iGPU) from processing any of the graphics workloads; and provide an amount of power utilized by the iGPU to a processor of the IHS; and if the temperature value is not below the threshold temperature value: determine that the iGPU is disabled; configure the IHS to utilize the iGPU for processing a portion of the graphics workloads; and enable the iGPU to process the portion of the graphics workloads; and remove the amount of power utilized by the iGPU from the at least one processor.

20 Claims, 7 Drawing Sheets

(56) References Cited

U.S. PATENT DOCUMENTS

| | | | |
|---|---|---|---|
| 2010/0332799 A1* | 12/2010 | Sonobe | G06F 1/3293 |
| | | | 712/E9.032 |
| 2016/0139589 A1* | 5/2016 | Chandra | G06F 1/206 |
| | | | 700/300 |
| 2017/0060220 A1* | 3/2017 | Grossmann | G06F 1/206 |
| 2021/0182066 A1* | 6/2021 | Shenoy | G06F 1/3296 |
| 2022/0253124 A1* | 8/2022 | Venkataraman | G06F 9/5094 |

* cited by examiner

SYSTEM AND METHOD OF ENHANCING PERFORMANCES OF INFORMATION HANDLING SYSTEMS BY UTILIZING GRAPHICS PROCESSING UNITS

BACKGROUND

Field of the Disclosure

This disclosure relates generally to information handling systems and more particularly to enhancing performances of information handling systems by utilizing graphics processing units.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine a temperature value associated with a discrete graphics processing unit (dGPU) of an information handling system; may determine if the temperature value is below a threshold temperature value; if the temperature value is below the threshold temperature value: may configure the information handling system to utilize the dGPU for processing graphics workloads of the information handling system; may disable an integrated graphics processing unit (iGPU) of the information handling system from processing any of the graphics workloads; and may provide an amount of power utilized by the iGPU to at least one processor of the information handling system; and if the temperature value is not below the threshold temperature value: may determine that the iGPU is disabled; may configure the information handling system to utilize the iGPU for processing a portion of the graphics workloads; may enable the iGPU to process the portion of the graphics workloads; and may remove the amount of power utilized by the iGPU from the at least one processor. In one or more embodiments, disabling the iGPU from processing any of the graphics workloads and/or providing the amount of power utilized by the iGPU to the at least one processor may be performed in response to configuring the information handling system to utilize the dGPU for graphics processing the graphics workloads of the information handling system. In one or more embodiments, enabling the iGPU to process the portion of the graphics workloads and/or removing the amount of power utilized by the iGPU from the at least one processor may be performed in response to configuring the information handling system to utilize the iGPU for the first portion of the graphics processing workloads.

In one or more embodiments, determining the temperature value associated with the dGPU may include receiving the temperature value associated with the dGPU from a temperature sensor. In one example, receiving the temperature value associated with the dGPU from the temperature sensor may include receiving the temperature value associated with the dGPU from the temperature sensor via a platform environment control interface (PECI) bus. In another example, the temperature sensor may be in physical contact with at least one of the dGPU and a heat pipe that removes heat from the dGPU.

In one or more embodiments, configuring the information handling system to utilize the dGPU for processing the graphics workloads may include providing a notification to information handling system firmware. For example, providing the notification to the information handling system firmware may include setting a model specific register to a specific value. For instance, the one or more systems, the one or more methods, and/or the one or more processes may further read the specific value from the model specific register via memory mapped input/output (MMIO).

In one or more embodiments, removing the amount of power utilized by the iGPU from the at least one processor may include configuring a processor package to remove the amount of power utilized by the iGPU from a power budget associated with the at least one processor. In one or more embodiments, the portion of the graphics workloads may include a graphics workload of rendering output of desktop applications executed by the at least one processor. In one or more embodiments, the threshold temperature value is at or about sixty degrees Celsius (60° C.).

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may include two graphics processing units (GPUs). For example, a first graphics processing unit (GPU) of the two GPUs may be integrated into a processor package (along with at least one processor), and a second GPU of the two GPUs may be external to the processor package. For instance, the second GPU may be communicatively coupled to the processor package. In one or more embodiments, graphics workloads may be switched between the first GPU and the second GPU. For example, utilizing the second GPU may enable a better performance of a processor included by the processor package. In one or more embodiments, an information handling system may include an integrated GPU (e.g., the first GPU) and a discrete GPU (e.g., the second GPU). For example, the information handling system may be configured to utilize the integrated GPU (iGPU) and the discrete GPU (dGPU) for various graphics workloads. For instance, the information handling system may be configured to utilize the iGPU for management and composition of desktop graphics and to utilize the dGPU for three-dimensional graphics rendering tasks.

In one or more embodiments, power consumption of the information handling system may be optimized based at least on utilizing the iGPU for most workload tasks and dynamically enabling dGPU when high performance three-dimensional graphics rendering is needed or desired. In one or more embodiments, the iGPU and the processor (e.g., a central processor unit) may share a power budget. For example, the processor may be limited to a threshold processing frequency when the iGPU is utilized. For instance, when the processor is limited to the threshold processing frequency, a loss in information processing performance may result.

In one or more embodiments, the information handling system may be a mobile information handling system. For example, the mobile information handling system may be configured to utilize an internal battery of the information handling system. In one or more embodiments, when the mobile information handling system is configured to utilize the internal battery, the mobile information handling system may be configured to utilize the iGPU by default. For example, the mobile information handling system may sacrifice information processing performance when the mobile information handling system is configured to utilize its internal battery.

In one or more embodiments, the iGPU may be dynamically disabled. For example, dynamically disabling the iGPU may increase power that may be utilized by the processor. In one or more embodiments, to avoid negatively impacting battery life, presence of AC (alternating current) power (e.g., power from a wall receptacle) may be checked as well as activity of the dGPU. If AC power is coupled to the information handling system and the dGPU is inactive, information processing performance by the processor may be increased by disabling the iGPU.

In one or more embodiments, configuring one or more power budgets may increase an amount of time the mobile information handling system may utilize its internal battery. For example, configuring the one or more power budgets may include dynamically disabling the iGPU. In one instance, disabling the iGPU may increase an amount of time the mobile information handling system may utilize its internal battery. In another instance, disabling the iGPU may not sacrifice information processing performance when the mobile information handling system is configured to utilize its internal battery. In one or more embodiments, when AC power is coupled to the mobile information handling system, either or both of the iGPU and the dGPU may be utilized. As an example, if the dGPU is capable of handling graphics processing tasks of the iGPU, the iGPU may be disable, and additional power may be provided to the processor, which may increase performance of the processor.

In one or more embodiments, the processor of the information handling system and a GPU of the information handling system may share a thermal coupling. In one or more embodiments, the processor and the GPU may share a thermal pipe. For example, the thermal pipe may transfer heat from one or more of the processor and the GPU, among others. In one or more embodiments, power consumption of one or more of a processor and a GPU may be minimized. In one example, the power consumption of the one or more of the processor and the GPU may be minimized to maximize a charge of the internal battery, which may provide power to the one or more of the processor and the GPU, among others. For instance, the information handling system may be a mobile information handling system. In another example, the power consumption of the one or more of the processor and the GPU may be minimized to minimize heat generated by the one or more of the processor and the GPU, among others.

In one or more embodiments, power to the dGPU may be controlled. For example, power to the dGPU may be provided to the discrete GPU and/or may be withheld from the discrete GPU. In one or more embodiments, the processor and the iGPU may share a power budget. For example, the processor and the iGPU may share power provided to the processor. For instance, the processor may share a portion of power it receives with its iGPU. In one or more embodiments, power to the iGPU may be controlled. For example, power to the iGPU may be provided to the iGPU and/or may be withheld from the iGPU. For instance, when power to the iGPU is withheld, the processor may utilize the power budget that was provided to the processor and the iGPU. As an example, the processor may utilize the power that the iGPU would have utilized.

Figure 1A:
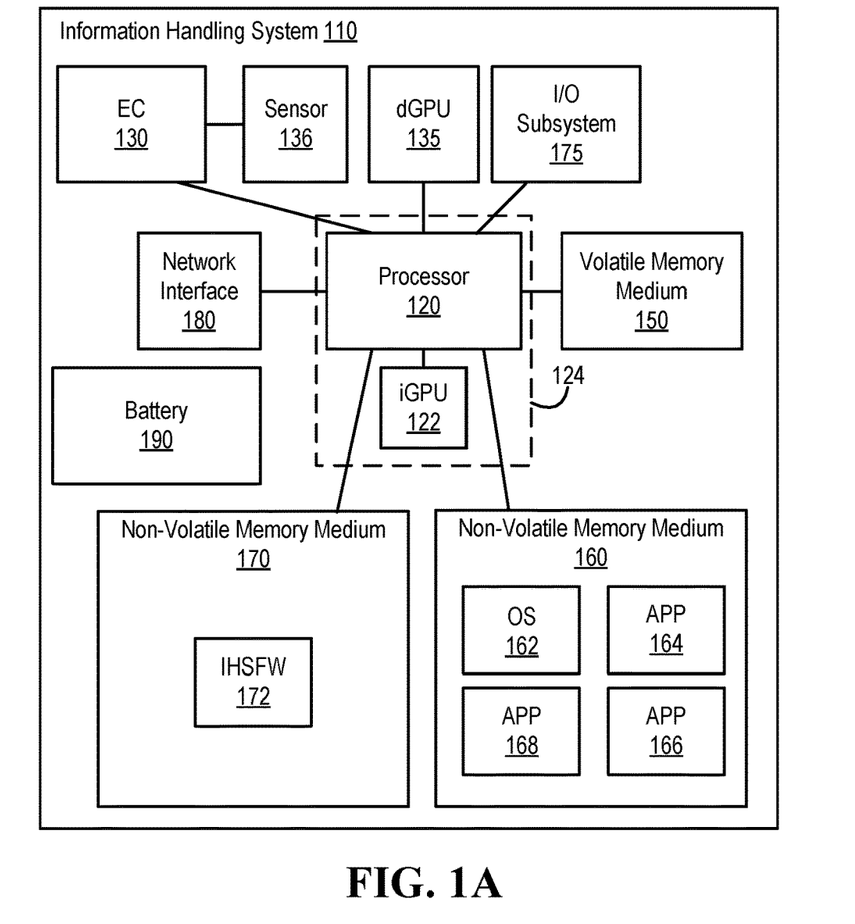
FIG. 1A illustrates an example of an information handling system, according to one or more embodiments.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, an iGPU 122, an embedded controller (EC) 130, a dGPU 135, a volatile memory medium 150, non-volatile memory media 160 and 170, an I/O subsystem 175, and a network interface 180. In one or more embodiments, a package 124 may include processor 120 and iGPU 122. For example, package 124 may be a processor package, which may house processor 120 and iGPU 122. As illustrated, iGPU 122, EC 130, dGPU 135, volatile memory medium 150, non-volatile memory media 160 and 170, I/O subsystem 175, and network interface 180 may be communicatively coupled to processor 120.

In one or more embodiments, one or more of iGPU 122, EC 130, dGPU 135, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile iGPU 122, EC 130, dGPU 135, memory medium 150, non-volatile memory media 160 and 170, I/O subsystem 175, and network interface 180 may be communicatively coupled to processor 120 via one or more PCI-Express (PCIe) root complexes. In another example, one or more of EC 130, dGPU 135, I/O subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, IHS 110 may include a sensor 136. For example, sensor 136 may be communicatively coupled to EC 130. In one or more embodiments, sensor 136 may determine one or more temperature values associated with temperatures proximate (e.g., close to) sensor 136. In one example, sensor 136 may be physically located close to dGPU 135. In a second example, sensor 136 may be physically touching dGPU 135. For instance, sensor 136 may be physically located on dGPU 135. In a third example, sensor 136 may be physically located close to a heat pipe of dGPU 135. In another example, sensor 136 may be physically touching the heat pipe of dGPU 135. For instance, sensor 136 may be physically located on the heat pipe of dGPU 135.

In one or more embodiments, IHS 110 may include a battery 190. In one example, battery 190 may store energy. In another example, battery 190 may provide power to one or more components of IHS 110. For instance, the one or more components of IHS 110 may include processor 120, iGPU 122, EC 130, dGPU 135, volatile memory medium 150, non-volatile memory media 160 and 170, I/O subsystem 175, and network interface 180, among others. In one or more embodiments, battery 190 may provide power to one or more components external to IHS 110. For example, the one or more components external to IHS 110 may include an external pointing device (e.g., a mouse, a touchpad, etc.), an external keyboard, a drive (e.g., a thumb drive, a portable storage device, etc.), and an external display, among others.

In one or more embodiments, EC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 130 may be or include an application processor. In one example, EC 130 may be or include an ARM Cortex-A processor. In another example, EC 130 may be or include an Intel Atom processor. In one or more embodiments, EC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 1B:
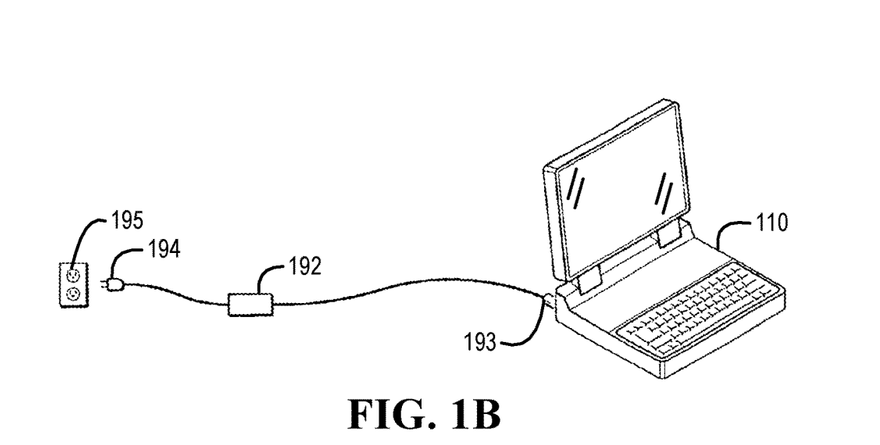
FIG. 1B illustrates another example of an information handling system, according to one or more embodiments.

Turning now to FIG. 1B, another example of an information handling system is illustrated, according to one or more embodiments. In one or more embodiments, IHS 110 may be a mobile information handling system. For example, IHS 110 may be coupled to an external power supply 192. In one instance, IHS 110 may receive power from external power supply 192 to power one or more components of IHS 110. In another instance, IHS 110 may receive power from external power supply 192 to charge battery 190.

In one or more embodiments, IHS 110 may be coupled to external power supply 192 via a plug 193. In one or more embodiments, external power supply 192 may be coupled to a plug 194. For example, plug 194 may be plugged into a receptacle 195. For instance, receptacle 195 may be a wall receptacle, which may provide alternating current (AC) to power supply 192. In one or more embodiments, external power supply 192 may receive AC power via plug 194 from plug 195. For example, external power supply 192 may provide direct current (DC) power to IHS 110 via plug 193.

Figure 2:
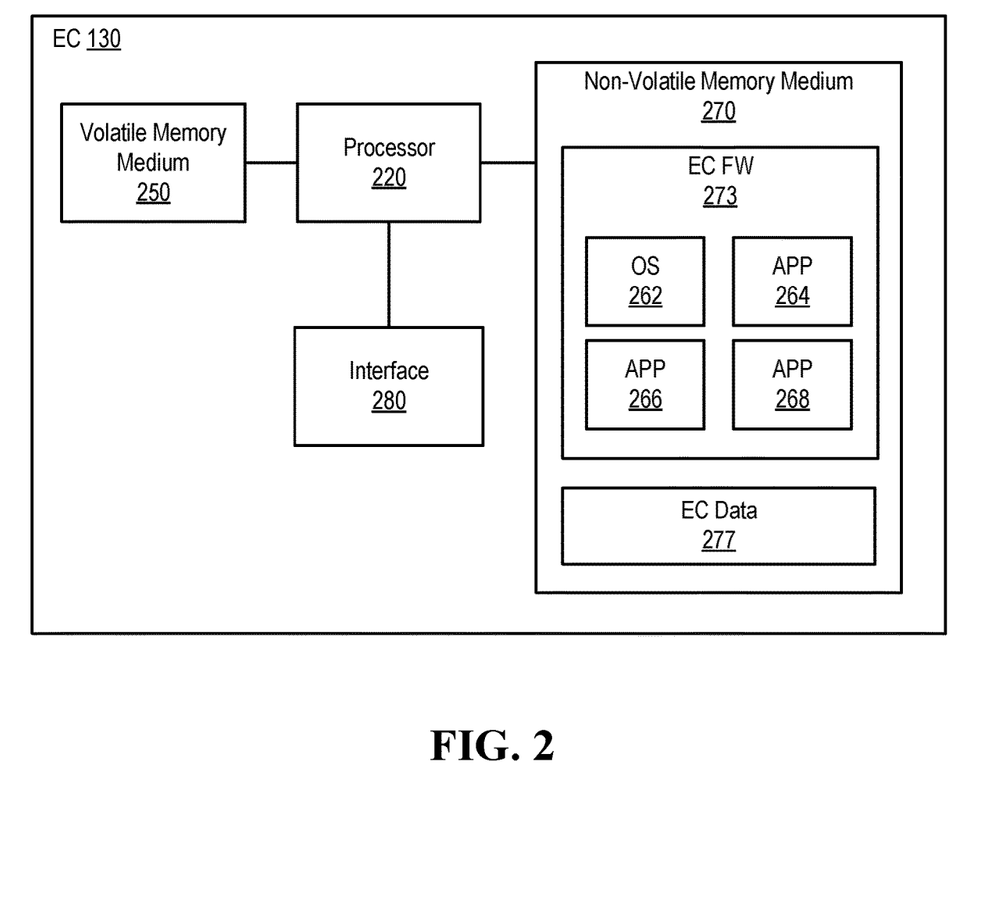
FIG. 2 illustrates an example of an embedded controller, according to one or more embodiments.

Turning now to FIG. 2, an example of an embedded controller is illustrated, according to one or more embodiments. As shown, EC 130 may include a processor 220, a volatile memory medium 250, a non-volatile memory medium 270, and an interface 280. As illustrated, non-volatile memory medium 270 may include a EC firmware (FW) 273, which may include an OS 262 and APPs 264-268, and may include EC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, EC 130 may utilize interface 280 to communicate with sensor 136. For example, EC 130 may utilize interface 280 to receive temperature values from sensor 136. In one or more embodiments, EC 130 may utilize interface 280 to communicate with processor 120. For example, interface 280 may be configured to communicate with processor 120 via a platform environment control interface (PECI). For instance, EC 130 may communicate with processor 120 via a PECI bus. In one or more embodiments, the PECI may utilize one or more on-die digital thermal sensors (DTS), which may provide digital data that includes one or more processor temperature values. For example, a processor temperature value may include a negative value, which may express a difference between a current temperature value and a thermal throttle point value. For instance, thermal throttle point value may be associated with a temperature at which processor 120 may reduce speed or shut down to prevent damage from overheating.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3A:
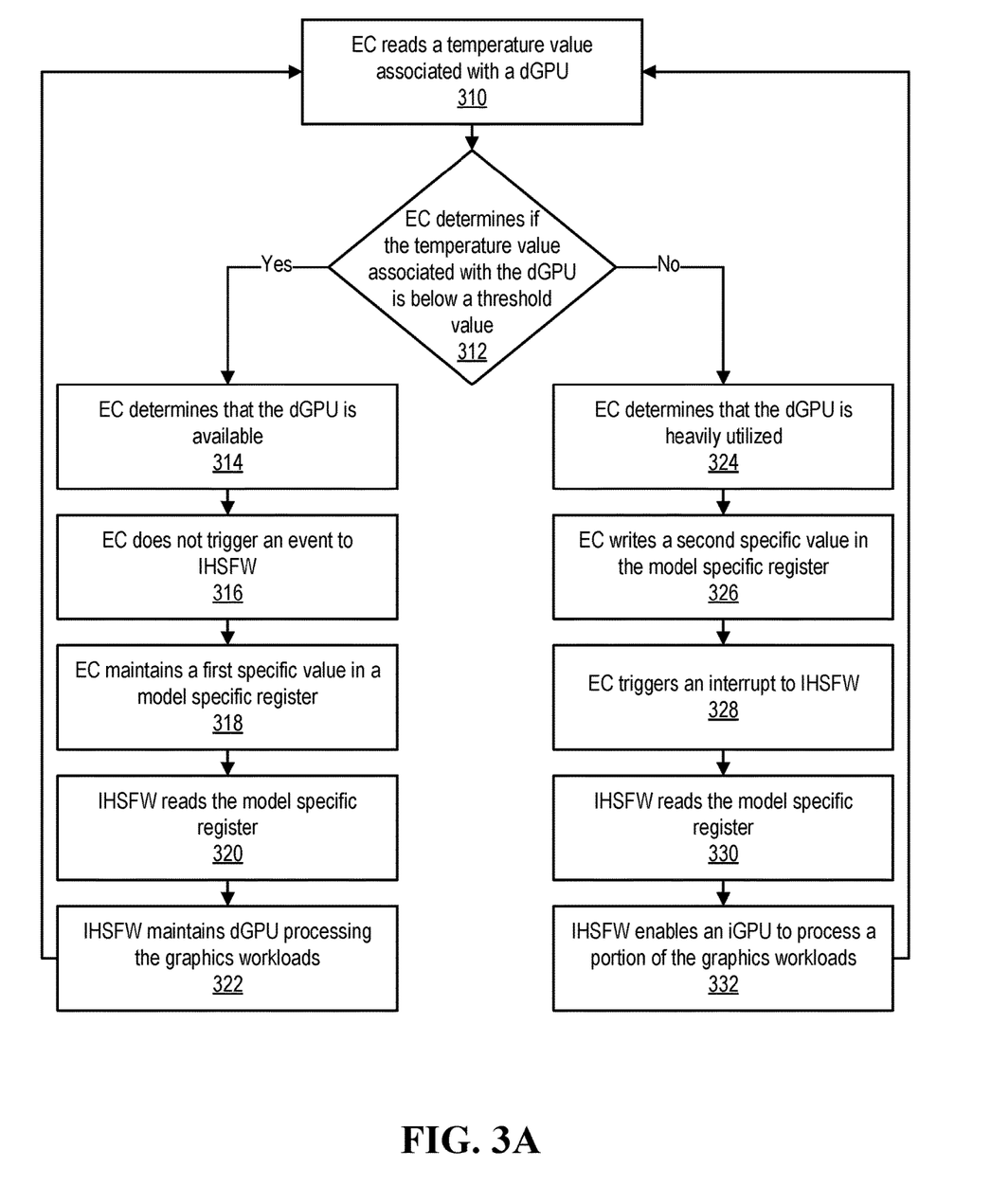
FIG. 3A illustrates an example of a method of utilizing an embedded controller to control an integrated graphics processing unit, according to one or more embodiments.

Turning now to FIG. 3A, an example of a method of utilizing an embedded controller to control an integrated graphics processing unit is illustrated, according to one or more embodiments. At 310, EC 130 may read a temperature value associated with dGPU 135. For example, EC 130 may read the temperature value associated with dGPU 135 from sensor 136. For instance, EC 130 may read the temperature value associated with dGPU 135 from sensor 136 via a PECI bus.

At 312, EC 130 may be determine if the temperature value associated with dGPU 135 is below a threshold temperature value. In one or more embodiments, the threshold temperature value may be at or about sixty degrees Celsius (60° C.). In one example, the threshold temperature value may be sixty degrees Celsius (60° C.). In another example, about sixty degrees Celsius (60° C.) may be sixty degrees Celsius (60° C.) plus or minus two degrees Celsius. For instance, the threshold temperature value may be sixty degrees Celsius (60° C.) plus or minus two degrees Celsius. In one or more embodiments, any threshold temperature value may be utilized.

If the temperature value associated with dGPU 135 is below the threshold temperature value, EC 130 may be determine that dGPU 135 is available, at 314. For example, EC 130 may determine that dGPU 135 is available to process one or more graphics workloads. For instance, EC 130 may determine that dGPU 135 is available to process additional graphics workloads. In one or more embodiments, determining that the dGPU is available may indicate that only processor 120 is processing instructions on processor package 124.

At 316, EC 130 may not trigger an event to IHSFW 172. At 318, EC 130 may maintain a first specific value in a model specific register. At 320, IHSFW 172 may read the model specific register. For example, IHSFW 172 may read the model specific register via memory mapped input/output (MMIO). At 322, IHSFW 172 maintain dGPU 135 processing the graphics workloads.

If the temperature value associated with dGPU 135 is not below the threshold temperature value, EC 130 may determine that dGPU 135 is heavily utilized, at 324. At 326, EC 130 may write a second specific value in the model specific register. At 328, EC 130 may trigger an interrupt to IHSFW 172. In one or more embodiments, writing the second specific value in the model specific register may trigger the interrupt to IHSFW 172. At 330, IHSFW 172 may read the model specific register. For example, IHSFW 172 may read the model specific register via MMIO. At 332, IHSFW 172 may enable iGPU 122 to process a portion of the graphics workloads.

Figure 3B:
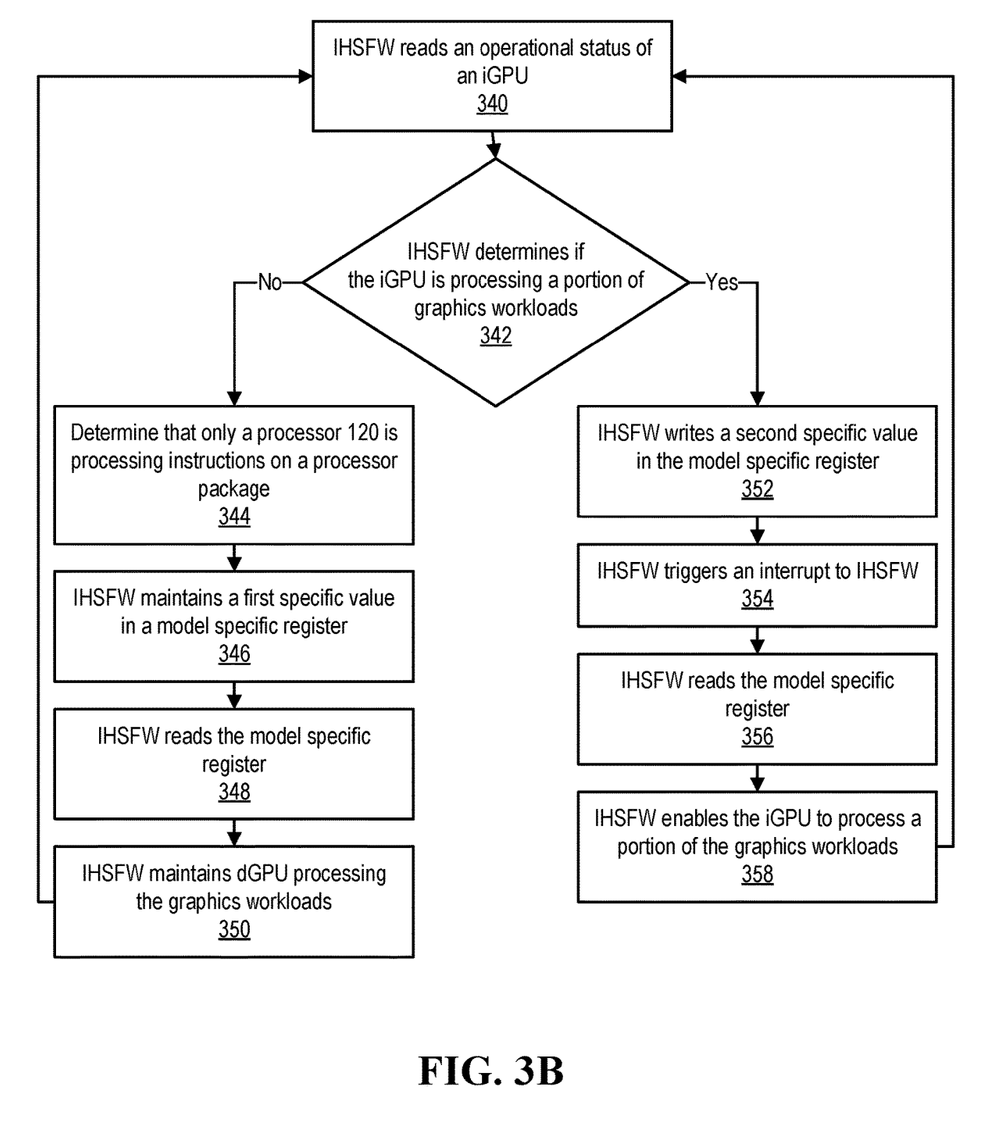
FIG. 3B illustrates an example of a method of utilizing information handling system firmware to control an integrated graphics processing unit, according to one or more embodiments.

Turning now to FIG. 3B, an example of a method of utilizing information handling system firmware to control an integrated graphics processing unit is illustrated, according to one or more embodiments. At 340, IHSFW 172 may read an operational status of iGPU 122. At 342, IHSFW 172 may determine if iGPU 122 is processing a portion of graphics workloads. If iGPU 122 is not processing the portion of graphics workloads, it may be determined that only processor 120 is processing instructions on processor package 124, at 344. At 346, IHSFW 172 may maintain a first specific value in a model specific register.

At 348, IHSFW 172 may read the model specific register. For example, IHSFW 172 may read the model specific register via MMIO. At 350, IHSFW 172 maintain dGPU 135 processing the graphics workloads. If iGPU 122 is processing the portion of graphics workloads, IHSFW 172 may write a second specific value in the model specific register, at 352. At 354, IHSFW 172 may trigger an interrupt. In one or more embodiments, writing the second specific value in the model specific register may trigger the interrupt to IHSFW 172. At 356, IHSFW 172 may read the model specific register. For example, IHSFW 172 may read the model specific register via MMIO. At 358, IHSFW 172 may enable iGPU 122 to process a portion of the graphics workloads.

Figure 4A:
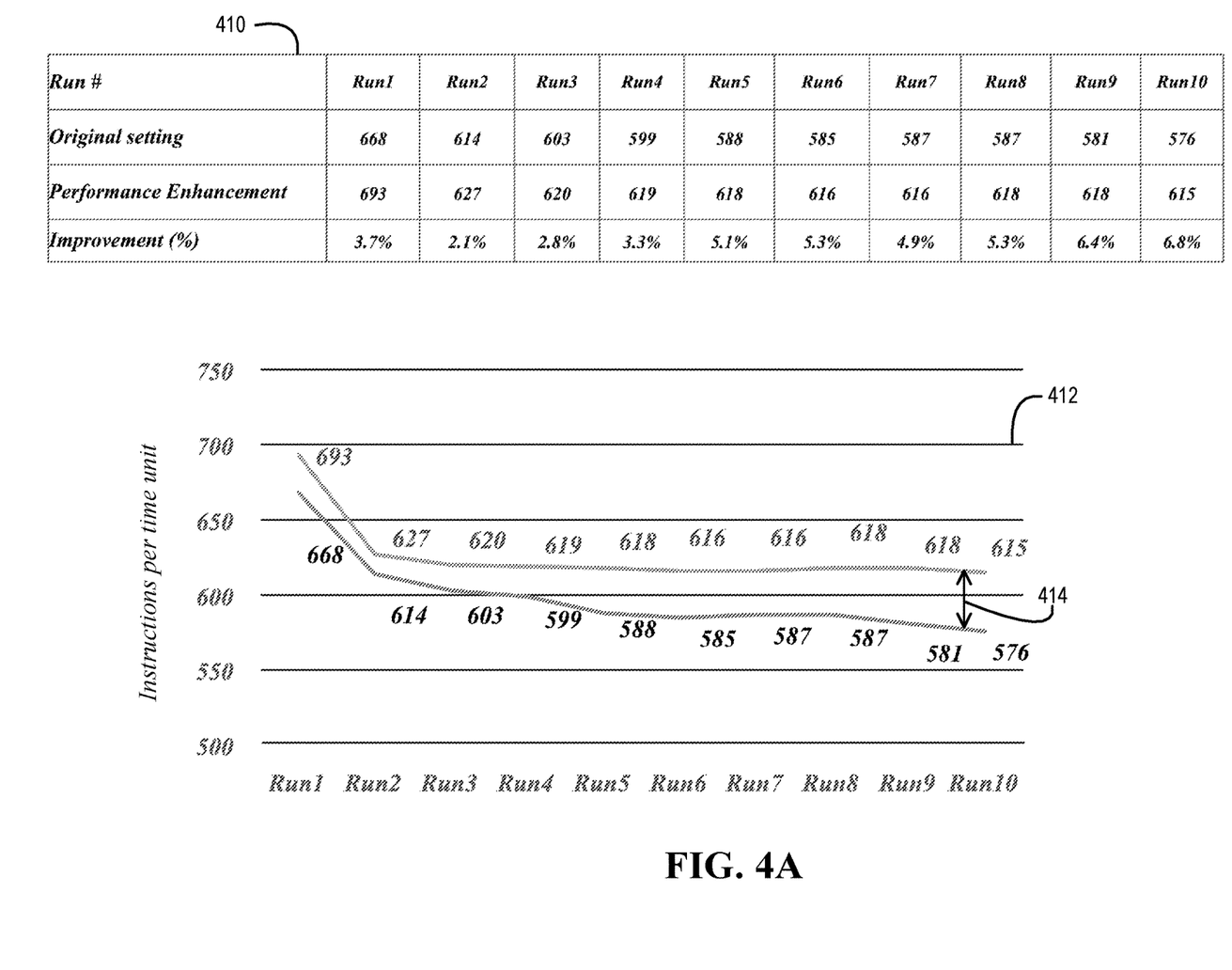
FIG. 4A illustrates a table of processor performances and a graph of the processor performances, according to one or more embodiments.

Tuning now to FIG. 4A, a table of processor performances and a graph of the processor performances are illustrated, according to one or more embodiments. As shown, a table 410 includes processor performances with performance enhancements of the method illustrated in FIG. 3A, without the performance enhancements of the method illustrated in FIG. 3A, and percentage improvements in processor performances. As illustrated, a graph 412 includes plots of processor performances with performance enhancements of the method illustrated in FIG. 3A and without the performance enhancements of the method illustrated in FIG. 3A. For example, a performance difference 414 shows an effectiveness of the performance enhancements of the method illustrated in FIG. 3A.

Figure 4B:
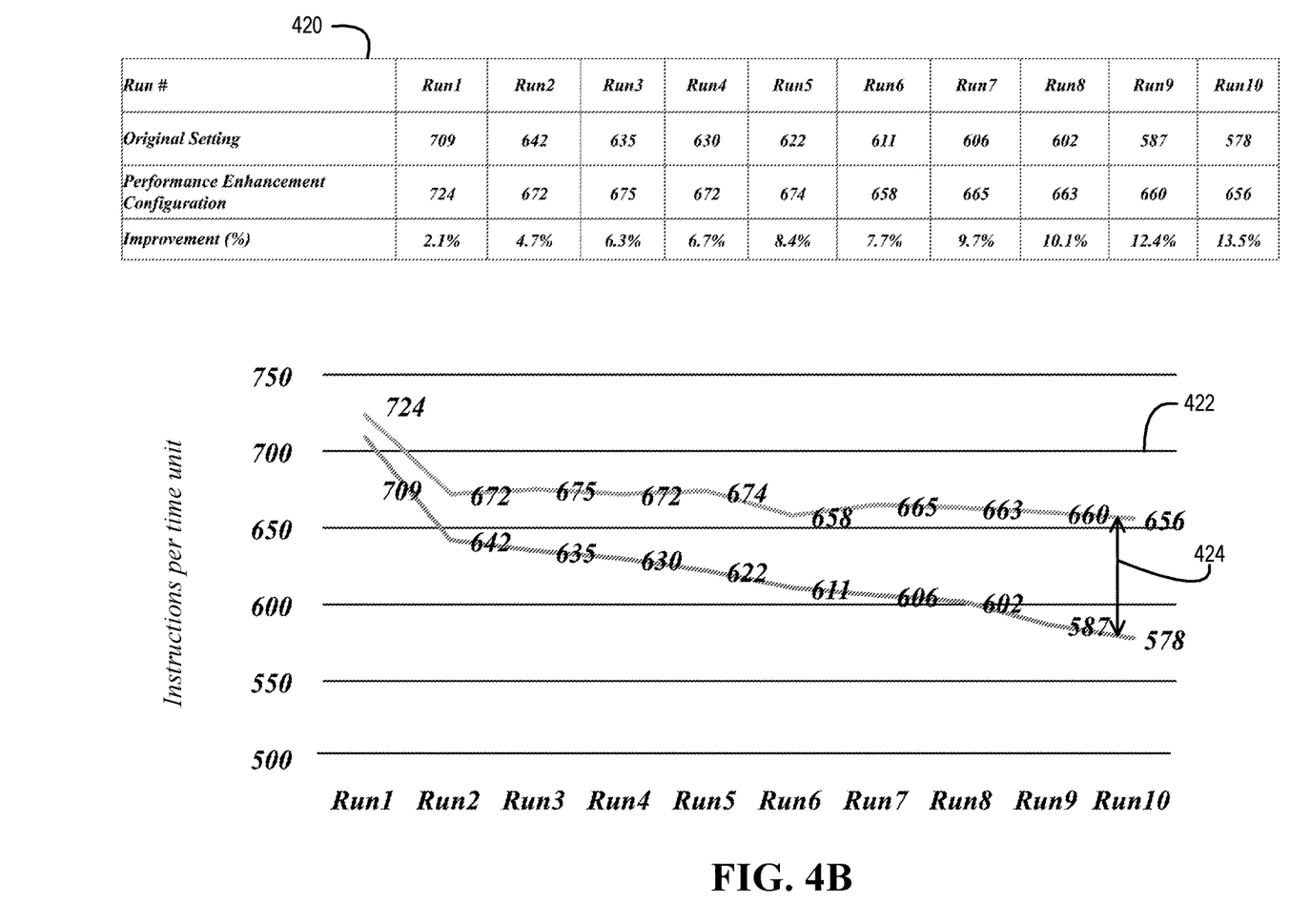
FIG. 4B illustrates another table of processor performances and another graph of the processor performances, according to one or more embodiments.

Tuning now to FIG. 4B, another table of processor performances and another graph of the processor performances are illustrated, according to one or more embodiments. As shown, a table 420 includes processor performances with performance enhancements of the method illustrated in FIG. 3B, without the performance enhancements of the method illustrated in FIG. 3B, and percentage improvements in processor performances. As illustrated, a graph 422 includes plots of processor performances with performance enhancements of the method illustrated in FIG. 3B and without the performance enhancements of the method illustrated in FIG. 3B. For example, a performance difference 424 shows an effectiveness of the performance enhancements of the method illustrated in FIG. 3B.

Figure 5:
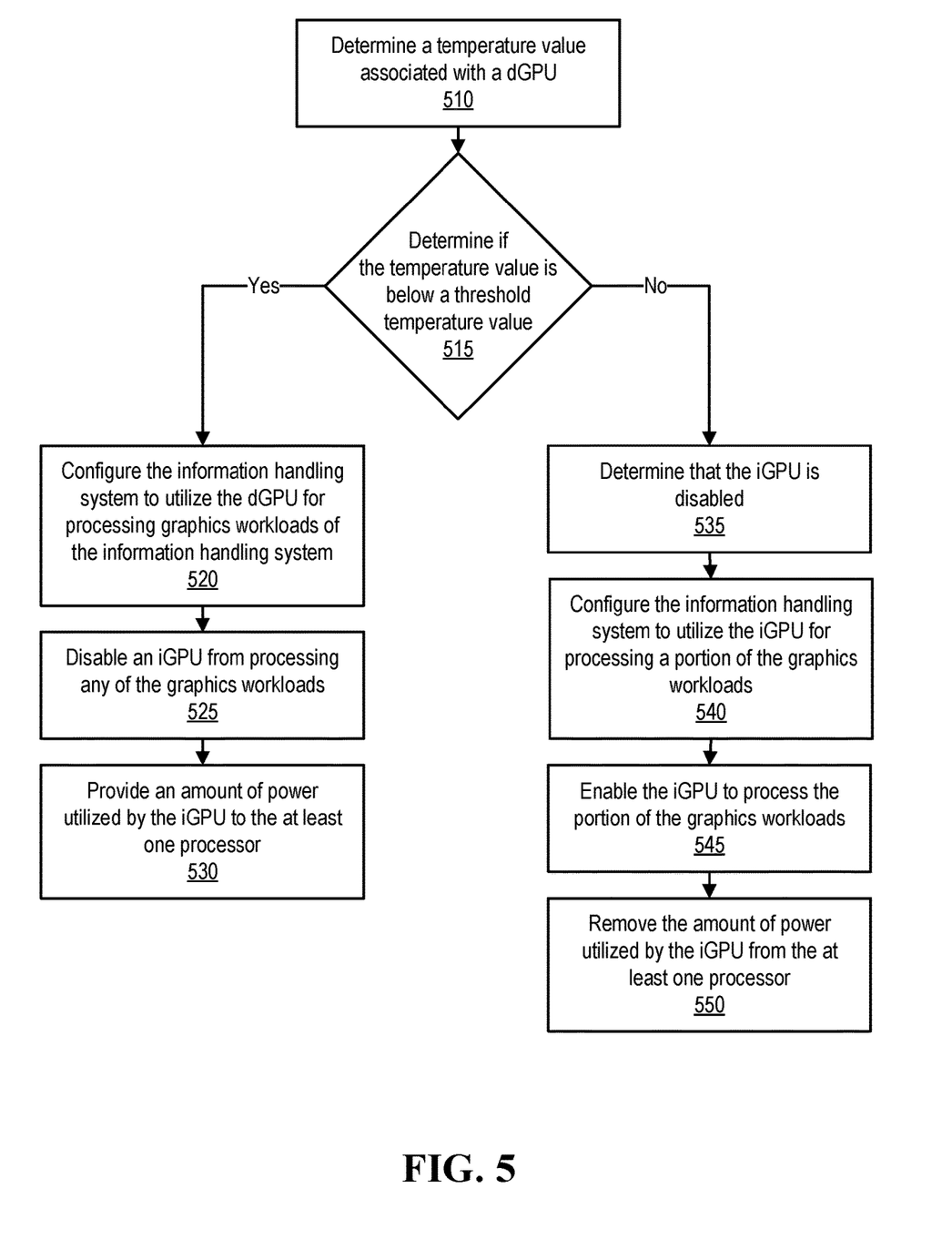
FIG. 5 illustrates an example of a method of operating an information handling system, according to one or more embodiments.

Turning now to FIG. 5, an example of a method of operating an information handling system is illustrated, according to one or more embodiments. At 510, a temperature value associated with a dGPU may be determined. For example, EC 130 may determine a temperature associated with dGPU 135. In one or more embodiments, determining the temperature value associated with the dGPU may include receiving the temperature value associated with the dGPU from a temperature sensor. For example, EC 130 may receive the temperature associated with dGPU 135 from sensor 136.

In one or more embodiments, receiving the temperature value associated with the dGPU from the temperature sensor may include receiving the temperature value associated with the dGPU from the temperature sensor via a PECI bus. For example, EC 130 may receive the temperature associated with dGPU 135 from sensor 136 via a PECI bus. In one or more embodiments, the temperature sensor may be in physical contact with at least one of the dGPU and a heat pipe that removes heat from the dGPU, among others. For example, sensor 136 may be in physical contact with at least one of dGPU 135 and a heat pipe that removes heat from dGPU 135, among others.

At 515, it may be determined if the temperature value is below a threshold temperature value. For example, EC 130 may determine if the temperature value is below a threshold temperature value. In one or more embodiments, the threshold temperature value may be at or about sixty degrees Celsius (60° C.). In one example, the threshold temperature value may be sixty degrees Celsius (60° C.). In another example, about sixty degrees Celsius (60° C.) may be sixty degrees Celsius (60° C.) plus or minus two degrees Celsius. For instance, the threshold temperature value may be sixty degrees Celsius (60° C.) plus or minus two degrees Celsius. In one or more embodiments, any threshold temperature value may be configured and/or utilized.

If the temperature value is below the threshold temperature value, the information handling system may be configured to utilize the dGPU for processing graphics workloads of the information handling system, at 520. For example, EC 130 may configure IHS 110 to utilize dGPU 135 for processing graphics workloads of IHS 110. In one instance, the graphics workloads of IHS 110 may include a graphics workload of rendering output of desktop applications (e.g., APPs of APPs 164-168) executed by processor 120. In a second instance, the graphics workloads of IHS 110 may include rendering output of a game executed by processor 120. In a third instance, the graphics workloads of IHS 110 may include transcoding a video file. As an example, the graphics workloads of IHS 110 may include transcoding a DVD to a file compliant with a MPEG-4 (MP4) format. In a fourth instance, the graphics workloads of IHS 110 may include output of a virtual reality application and/or game executed by processor 120. In a fifth instance, the graphics workloads of IHS 110 may include output of an augmented reality application and/or game executed by processor 120. In another instance, the graphics workloads of IHS 110 may include any process that may utilize a single instruction multiple data (SIMD) architecture of a GPU.

In one or more embodiments, iGPU 122 may not process a graphics workload as fast as dGPU 135 can process the graphics workload. For example, iGPU 122 may be utilized to process less intensive graphics workloads. For instance, iGPU 122 may be utilized to process one or more graphics workloads that may associated with a desktop of a graphical user interface (GUI). In one or more embodiments, configuring the information handling system to utilize the dGPU for processing the graphics workloads may include providing a notification to information handling system firmware. For example, EC 130 may provide a notification to IHSFW 172 to configure IHS 110 to utilize the dGPU for processing the graphics workloads. In one or more embodiments, providing the notification to the information handling system firmware may include setting a model specific register to a specific value. For example, EC 130 may set a model specific register to a specific value. In one or more embodiments, the model specific register may be a portion of volatile memory medium 150. For example, the model specific register may be accessed via an address of volatile memory medium 150. In one or more embodiments, the information handling system firmware may read the specific value from the model specific register via MMIO. For example, IHSFW 172 may read the specific value from the model specific register via MMIO.

At 525, an iGPU may be disabled from processing any of the graphics workloads. For example, IHSFW 172 may disable iGPU 122 from processing any of the graphics workloads. In one or more embodiments, disabling the iGPU from processing any portion of the graphics workloads may include configuring a package that includes the iGPU and at least one processor of the information handling system to disable the from processing any portion of the graphics workloads. For example, IHSFW 172 may configure package 124 disable iGPU 122 from processing any portion of the graphics workloads.

At 530, an amount of power utilized by the iGPU may be provided to the at least one processor. For example, an amount of power utilized by iGPU 122 may be provided to processor 120. For instance, IHSFW 172 may provide the amount of power utilized by iGPU 122 to processor 120. As an example, IHSFW 172 may configure package 124 to provide the amount of power utilized by iGPU 122 to processor 120. In one or more embodiments, since iGPU 122 is no longer processing any portion of the graphics workloads, the power that it was utilizing may be utilized by processor 120. For example, a performance of processor 120 may be increased by utilizing the power that iGPU 122 was utilizing. For instance, when processor 120 receives more power, performance of processor 120 may increase. In one or more embodiments, one or more of disabling the iGPU from processing any of the graphics workloads and providing the amount of power utilized by the iGPU to the at least one processor may be performed in response to configuring the information handling system to utilize the dGPU for graphics processing the graphics workloads of the information handling system.

If the temperature value is not below the threshold value, it may be determined that the iGPU is disabled, at 535. For example, EC 130 may determine that iGPU 122 is disabled. At 540, the information handling system may be configured to utilize the iGPU for processing a portion of the graphics workloads. For example, EC 130 may configure IHS 110 to utilize iGPU 120 for processing a portion of the graphics workloads. In one or more embodiments, the portion of the graphics workloads may include a graphics workload of rendering output of desktop applications executed by the at least one processor. For example, EC 130 may configure IHS 110 to utilize iGPU 120 for rendering output of desktop applications executed by the at least one processor.

At 545, the iGPU may be enabled to process the portion of the graphics workloads. For example, IHSFW 172 may enable iGPU 122 to process the portion of the graphics workloads. For instance, IHSFW 172 may configure package 124 to enable iGPU 122 to process the portion of the graphics workloads. At 550, the amount of power utilized by the iGPU may be removed from the at least one processor. For example, IHSFW 172 may remove the amount of power utilized by iGPU 122 from processor 120. For instance, IHSFW 172 may configure processor package 124 to remove the amount of power utilized by iGPU 122 from processor 120. In one or more embodiments, since iGPU 122 will be processing the portion of the graphics workloads, iGPU 122 will utilize power. For example, a performance of processor 120 may be decreased by removing the amount of power utilized by iGPU 122.

In one or more embodiments, removing the amount of power utilized by the iGPU from the at least one processor may include configuring the processor package to remove the amount of power utilized by the iGPU from a power budget associated with the at least one processor. For example, IHSFW 172 may configure processor package 124 to remove the amount of power utilized by iGPU 122 from a power budget associated with processor 120. In one or more embodiments, one or more of enabling the iGPU to process the portion of the graphics workloads and removing the amount of power utilized by the iGPU from the at least one processor may be performed in response to the embedded controller configuring the information handling system to utilize the iGPU for the first portion of the graphics processing workloads.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
 a processor package that includes at least one processor and an integrated graphics processing unit (iGPU);
 a discrete graphics processing unit (dGPU);
 an embedded controller; and
 a memory medium, coupled to the at least one processor, that stores instructions executable by the at least one processor;
 wherein the embedded controller is configured to:
  determine a temperature value associated with the dGPU;
  determine that the temperature value is below a threshold temperature value; and
  in response to determining that the temperature value is below the threshold temperature value, configure the information handling system to utilize the dGPU for processing graphics workloads of the information handling system;
 wherein the instructions, when executed by the at least one processor, cause the information handling system to disable the iGPU from processing any of the graphics workloads and provide an amount of power utilized by the iGPU to the at least one processor, in response to the embedded controller configuring the information handling system to utilize the dGPU for graphics processing the graphics workloads of the information handling system;
 wherein the embedded controller is further configured to, if the temperature value is not below the threshold temperature value:
  determine that the iGPU is disabled; and
  configure the information handling system to utilize the iGPU for processing a portion of the graphics workloads; and
 wherein the instructions further cause the information handling system to enable the iGPU to process the portion of the graphics workloads and remove the amount of power utilized by the iGPU from the at least one processor, in response to the embedded controller configuring the information handling system to utilize the iGPU for the portion of the graphics processing workloads.

2. The information handling system of claim 1, wherein, to determine the temperature value associated with the dGPU, the embedded controller is further configured to receive the temperature value associated with the dGPU from a temperature sensor.

3. The information handling system of claim 2, wherein, to receive the temperature value associated with the dGPU from the temperature sensor, the embedded controller is further configured to receive the temperature value associated with the dGPU from the temperature sensor via a platform environment control interface (PECI) bus.

4. The information handling system of claim 2, wherein the temperature sensor is in physical contact with at least one of the dGPU and a heat pipe that removes heat from the dGPU.

5. The information handling system of claim 1, wherein the configuring the information handling system to utilize the dGPU for processing the graphics workloads includes providing a notification to the information handling system firmware.

6. The information handling system of claim 5, wherein, to provide the notification to the information handling system firmware, the embedded controller is further configured to set a model specific register to a specific value.

7. The information handling system of claim 6, wherein the instructions further cause the information handling system to read the specific value from the model specific register via memory mapped input/output (MMIO).

8. The information handling system of claim 1, wherein, to remove the amount of power utilized by the iGPU from the processor, the instructions further cause the information handling system to configure the processor package to remove the amount of power utilized by the iGPU from a power budget associated with the processor.

9. The information handling system of claim 1, wherein the portion of the graphics workloads includes a graphics workload of rendering output of desktop applications executed by the at least one processor.

10. The information handling system of claim 1, wherein the threshold temperature value is at or about sixty degrees Celsius (60° C.).

11. A method, comprising:
- determining, by an embedded controller of an information handling system, a temperature value associated with a discrete graphics processing unit (dGPU) of the information handling system;
- determining, by the embedded controller, that the temperature value is below a threshold temperature value;
- in response to determining that the temperature value is below the threshold temperature value:
  - configuring, by the embedded controller, the information handling system to utilize the dGPU for processing graphics workloads of the information handling system;
  - disabling, by information handling system firmware, an integrated graphics processing unit (iGPU) of a processor package of the information handling system from processing any of the graphics workloads; and
  - providing, by the information handling system firmware, an amount of power utilized by the iGPU to a processor of the processor package; and
- if the temperature value is not below the threshold temperature value:
- determining, by the embedded controller, that the iGPU is disabled;
- configuring, by the embedded controller, the information handling system to utilize the iGPU for processing a portion of the graphics workloads; and
- enabling, by the information handling system firmware, the iGPU to process the portion of the graphics processing workloads; and
- removing, by the information handling system firmware, the amount of power utilized by the iGPU from the processor.

12. The method of claim 11, wherein the determining the temperature value associated with the dGPU includes receiving the temperature value associated with the dGPU from a temperature sensor.

13. The method of claim 12, wherein the receiving the temperature value associated with the dGPU from the temperature sensor includes receiving the temperature value associated with the dGPU from the temperature sensor via a platform environment control interface (PECI) bus.

14. The method of claim 12, wherein the temperature sensor is in physical contact with at least one of the dGPU and a heat pipe that removes heat from the dGPU.

15. The method of claim 11, wherein the configuring the information handling system to utilize the dGPU for processing the graphics workloads includes providing a notification to the information handling system firmware.

16. The method of claim 15, wherein the providing the notification to the information handling system firmware includes setting a model specific register to a specific value.

17. The method of claim 16, further comprising:
- reading, by the information handling system firmware, the specific value from the model specific register via memory mapped input/output (MMIO).

18. The method of claim 11, wherein the removing the amount of power utilized by the iGPU from the processor includes configuring, by the information handling system firmware, the processor package to remove the amount of power utilized by the iGPU from a power budget associated with the processor.

19. The method of claim 11, wherein the portion of the graphics workloads includes a graphics workload of rendering output of desktop applications executed by the at least one processor.

20. The method of claim 11, wherein the threshold temperature value is at or about sixty degrees Celsius (60?C).

* * * * *